United States Patent [19]

Weber

[11] Patent Number: 4,712,371
[45] Date of Patent: Dec. 15, 1987

[54] PROCESS AND DEVICE FOR STARTING A GAS TURBINE

[75] Inventor: Thomas Weber, Oberursel, Fed. Rep. of Germany

[73] Assignee: Klöckner-Humboldt-Deutz AG, Cologne, Fed. Rep. of Germany

[21] Appl. No.: 797,903

[22] Filed: Nov. 14, 1985

[30] Foreign Application Priority Data

Nov. 14, 1984 [DE] Fed. Rep. of Germany ....... 3441509

[51] Int. Cl.4 .............................................. F02C 7/27
[52] U.S. Cl. ............................... 60/39.142; 60/39.821
[58] Field of Search ............. 60/39.142, 39.37, 39.821, 60/39.823

[56] References Cited

U.S. PATENT DOCUMENTS 3,327,473 6/1967 Smith .................................. 60/39.47
4,161,102 7/1979 Jasas et al. ........................ 60/39.142

Primary Examiner—Louis J. Casaregola
Attorney, Agent, or Firm—Watson, Cole, Grindle & Watson

[57] ABSTRACT

A process and a device for starting a gas turbine such as a jet engine which contains a compressor, a turbine and a combustion chamber by means of hot exhaust gases from an exhaust gas source, wherein the energy of the exhaust gases is transferred at least partially to the gas turbine for the starting process. For this purpose the hot exhaust gases are used for simultaneously driving the turbine and for igniting the combustion in the combustion chamber. A single exhaust gas source can be used. In this manner, a large number of component parts are eliminated and the reliability of the starting process is considerably increased overall.

8 Claims, 2 Drawing Figures

PROCESS AND DEVICE FOR STARTING A GAS TURBINE

BACKGROUND OF THE INVENTION

Field of The Invention

This invention relates to a process for starting a gas turbine which includes a compressor, a turbine, and a combustion chamber, by means of hot exhaust gases from an exhaust gas source, wherein the energy of the exhaust gases is at least partially transferred to the gas turbine for the starting process. In addition, this invention relates to a device for starting such a gas turbine.

THE PRIOR ART

For starting gas turbines, in particular jet engines, the use of separately produced hot exhaust gases for driving the turbo-generator during the starting procedure is an often tried procedure. In this manner, the hot exhaust gases are produced, in most cases, by ignited solid exhaust turbo-generators, e.g., in the form of cartouches, whereby the exhaust gases of several cartouches drive the turbine of the turbo-generator. Largely simultaneously, but independently, the combustion chamber is ignited either electrically or by the exhaust gases of another cartouche. After a short time, the turbo-generator reaches speed, so that the compressor pushes compressed air into the combustion chamber where, due to ignition, regular combustion is started with injected exhaust. As the fuel gases of the solid fuel turbo-generators may have a strongly eroding or corroding effect on the turbine blades, such exhaust gases are often directed not to the main turbine of the gas turbine device, but to a separate auxiliary or starter turbine (See German Pat. No. 12 56 481). This starter turbine is coupled to the turbo-generator and drives it during the starting process with the energy from the exhaust gases. The combustion chamber is ignited separately from this installation. In each case it is necessary, i.e., for the safe operation of the starting process, that all exhaust gas sources and the combustion chamber ignition operate almost simultaneously and without fail.

It is a disadvantage in such a process for starting a gas turbine that there is no connection between the driving of the turbine and the ignition of the combustion chamber. If, e.g., the ignition of the combustion chamber fails, the whole starting process has to be repeated. In addition, a large number of parts are needed for the safe operation of the starting proces, such as even an additional auxiliary turbine and a separate device for ignition. A gas turbine which has to be started in this manner is thus accordingly expensive in production.

SUMMARY OF THE INVENTION

For this reason it is the purpose of the present invention to improve the process and the device for the starting of gas turbines of this type to the extent that the construction expense of the whole gas turbine installation is reduced and that the reliability of the starting process itself is considerably improved.

In the process according to the invention that the hot exhaust gases from one exhaust gas source are used, during the starting process, simultaneously for driving the turbine and for the ignition of the combustion chamber. This solution, according to the invention, fully eliminates in an advantageous manner the construction expense for a separate ignition device for the combustion chamber and it improves the reliability of the starting process, as the ignition of the combustion chamber forcibly takes place along with the driving of the turbine. Thus, a failure of the process for starting a gas turbine is almost completely excluded.

The process according to the invention is of particular advantage and importance for single use gas turbines, as they are used, e.g., in jet engines of unmanned missiles for single use (drones). In such jet engines the requirement for low construction cost and absolute reliability of the starting process are of utmost importance.

In a suitable further development of the invention the exhaust gas current directed to the gas turbine is divided into two component currents, whereby the first component current is led directly to the turbine and the second component current directly to the combustion chamber. This provides for a sure ignition and the driving of the gas turbine. The ratio of the exhaust gas amounts of these two component currents can be freely chosen by constructive measures. It may also be suitable as an alternative, to lead the full exhaust gas current into the combustion chamber with a port directed towards the turbine and thus to first ignite the fuel in the combustion chamber by means of the hot exhaust gases, and then, with the same exhaust gases, to drive the turbine of the gas turbine. In this manner, the exhaust gas current is forced to provide ignition and drive of the turbine by being forced, in sequence, through the combustion chamber as well as through the turbine.

In a suitable further development of the process according to the invention all exhaust gases needed for the whole starting process are supplied by only one exhaust gas source. This exhaust gas source is, in most cases, a cartouche which contains solid fuel and is connected to the gas turbine through a supply channel. In a particularly advantageous manner the cartouche can even be arranged outside of the gas turbine engine, especially outside of the whole unmanned missile and can, in order to reduce the weight of the gas turbine installation, be separated from it after the starting process. In each case, the high reliability of the starting process is assured by the use of only one cartouche; even if this cartouche should fail, it is possible to quickly install a replacement cartouche and the starting process can be repeated almost without delay.

This type of an installation for starting a gas turbine is characterized, according to the invention, by the fact that the exhaust gases are led from an exhaust gas source through a supply channel to the gas turbine, whereby the supply channel is connected, on the one hand, to the turbine for drive purposes and, on the other hand, to the combustion chamber for the ignition of a fuel. In such an installation according to the invention, a large number of separate component parts are eliminated and the safe function of the starting process by the combination of the combustion chamber ignition with the simultaneous drive of the turbo-generator is achieved.

In a suitable further development of the device according to the invention, the hot exhaust gases are led into the combustion chamber not only in one place, but, e.g., in a ring combustion chamber with several separate sectional combustion chambers, by several individual component lines into each of the sectional combustion chambers. In this manner, the simultaneous ignition of the combustion in all sectional combustion chambers is advantageously attained.

It is also suitable to direct the hot exhaust gases to several places on the turbine simultaneously, i.e., onto the blade wheel of the turbine. The supply channel then is branched out into several individual component lines, which lead, preferably symmetrically distributed, to the blade wheel of the turbine. It is particularly advantageous to have two component lines, exactly opposite each other, or three which are evenly distributed along the circumference; as in this manner the blade wheel is symmetrically charged by the striking exhaust gases.

In a particularly suitable embodiment of the invention, the exhaust gas source supplies exhaust gas at a temperature of at least 1200° C. At this temperature the secure ignition of the combustion chamber is guaranteed on the one hand, and, on the other hand, the highest admissible temperature for the turbine blades is not exceeded. For example, there are types of powder for solid fuel generators commercially available which assure that such a temperature is attained in the exhaust gas current.

A simple model of a solid exhaust cartouche can be used as an exhaust gas source; this construction always provides the right amount of exhaust gases in the desired temperature range with optimal repeat accuracy. In addition, it is possible to easily exchange the cartouches which provides for their easy handling. In many types of use it may also be suitable to produce the exhaust gases in a separate burner from a fuel which is liquid as well as gaseous.

For this purpose it is possible to use as fuel also the fuel of the gas turbine, which makes it unnecessary to provide separate exhaust for the cartouches or a second fuel. In such a fuel gas source which works with liquid or gaseous fuel it is possible to, on the one hand, adapt the quantity, as well as, on the other hand, the temperature to the requirements of special application cases in starting procedures. A starting mechanism for gas turbines, working according to the principle of the invention, would thus not be limited to a single designated gas turbine where the exhaust gas source is concerned, but could be suitably adapted, without changing any parts, to a wide spectrum of gas turbines to be started, simply by adapting the temperature and amount of the exhaust gases.

The features for the advantages of the present invention can be better understood by reference to the attached drawings taken in conjunction with the following discussion.

DETAILED DESCRIPTION OF THE PREFERRED EMBODIMENT

Figure 1:
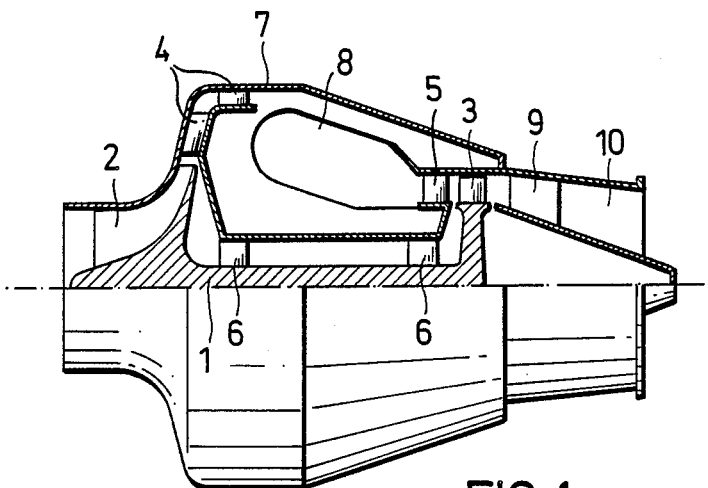
FIG. 1 schematically depicts a side view of a typical gas turbine.

FIG. 1 shows is a gas turbine with a radial compressor and an axial turbine. The rotor 1 of the gas turbine mounts on one axial end the blade wheel 2 of the radial compressor and at the other axial end the blade wheel 3 of the turbine. Also provided are a fixed guide wheel 4 of the compressor and a guide wheel 5 of the turbine. The rotor 1 is mounted on two bearings 6, finally at the outer housing 7, radially, as well as axially. A combustion chamber 8 is arranged between the compressor and the turbine, this combustion chamber being composed of several sectional combustion chambers, arranged in a circular manner. Adjacent to the blade wheel 3 is a nozzle ring 9 and a diffusor 10. With an appropriate layout, the shown gas turbine is a simple jet engine. An altered version with a flange mounted power output can also be used in a stationary manner for driving a device which needs to be driven.

Figure 2:
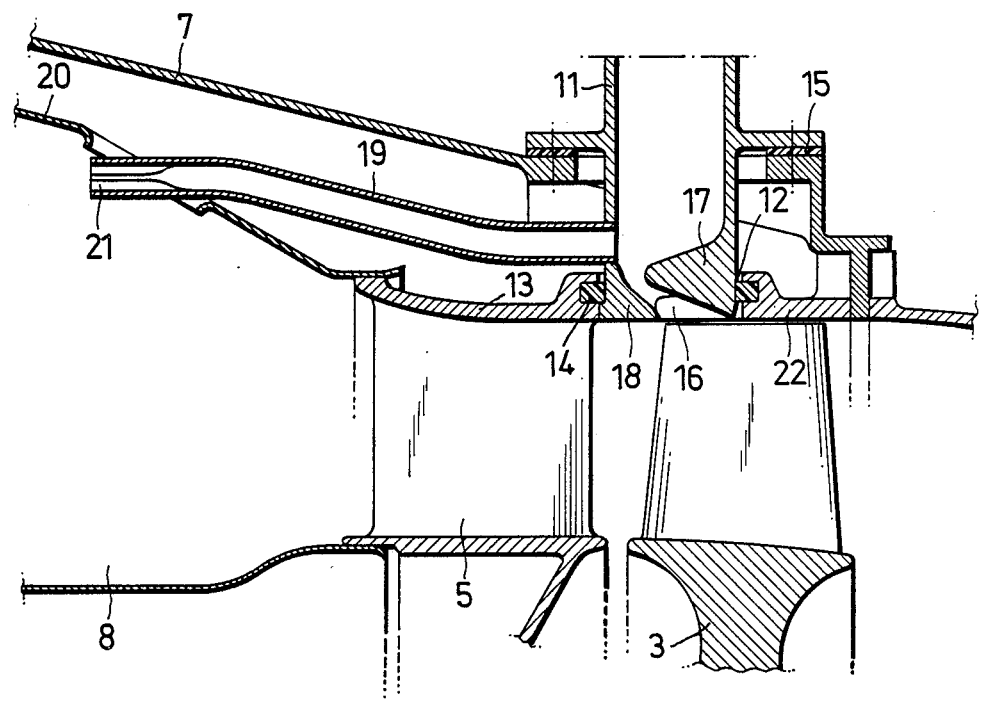
FIG. 2 shows a portion of the gas turbine shown in FIG. 1 which has been modified to include a device according to the present invention.

FIG. 2 shows essentially the blade wheel 3 and the guide wheel 5 of the turbine in a gas turbine installation, as well as the combustion chamber 8 together with a device according to the invention. A supply channel 11 in the form of a pipe extends through the outer housing 7 at the axial level of the blade wheel 3 and transversely to the axis of the rotor 1. The supply channel 11 protrudes radially through a boring 12 in an outer cylinder wall 22 into the current channel of the turbine, whereby the outer cylinder wall 22 separates the current channel of the turbine radially towards the outside and axially from the guide wheel 5 to the diffusor 10. A flexible heat resistant ring 14 provides a gastight seal for the boring 12. In addition, the supply channel 11 is firmly connected to the outer housing 7 via heat insulation in the form of an insulation ring 15. The opening 16 of the supply channel 11 points directly toward the blade wheel 3 and has the shape of a nozzle, so that the exhaust gas flow exiting there at least obtains a flow direction component in the turbine axis direction as well as in the direction of the turbine circumference. The nozzle effect also can increase the flow speed in an advantageous manner. For the optimal construction of the opening 16 the supply channel 11 is provided with a nose-shaped indentation 17 extending from one wall radially past the central axis, and a diffusor 18 arranged offset to the latter.

Within the outer housing 7 of the gas turbine, a pipe-shaped branch line 19 from the supply channel 11 is provided. The branch line 19 runs approximately horizontal, starting from the supply channel 22 opposite the nose-shaped indentation 17, extending approximately parallel to the rotor axis into the combustion chamber 8. The branch line 19 protrudes through the wall 20 of the combustion chamber and reaches into the inside of the combustion chamber with its nozzle-shaped end 21, the end 21 being fan-shaped.

Beyond the nose-shaped indentation 17, and leading into the opening 16, the supply channel 11 forms a first component current, and a second component current is formed in the branch line 19. the current cross section of the branch line is sized in such a manner that there is an essential pressure drop. This pressure drop in the branch line 19 is considerably greater than the pressure drop in the first component current. A medium flowing through the supply channel 11 is thus directed to the blade wheel 3 of turbine mainly by the first component current and the opening 16.

Arranged outside and separate from the gas turbine is an exhaust gas source, not shown, connected to the supply channel 11. As a particularly suitable version, this exhaust gas source can be an exchangable solid exhaust cartouche. For starting the gas turbine, the exhaust gas source is ignited and the hot exhaust gases flow through the supply channel 11 in a straight line to the blade wheel 3 of the turbine. Inside the outer housing 7 of the gas turbine, the exhaust gases separate at the nose-shaped indentation 17 into at least two component currents. The first component current flows by the nose-shaped indentation 17 and the connected diffusor 18 and through the opening 16, and directly hits the blade wheel 3 of the turbine, which is thus driven. A considerably smaller component current of exhaust gases (the second component current) is diverted by the nose-shaped indentation 17 into the branch line 19. The exhaust gases flow through the branch line 19 and the nozzle-shaped end 21 into the inside of the combustion chamber 8. The nozzle-shaped end 21 fans the exhaust gases for the widest and flattest flame possible.

The hot exhaust gases of the first component current cause the rotor 1 to turn and the compressor starts to supply compressed air to the combustion chamber 8. The second component current ignites the exhaust injected into the combustion chamber 8 by means of the hot fuel gases which exit through the nozzle-shaped end 21 in the form of flames. The regular combustion of the fuel with the compressed air starts. The ensuing hot combustion gases flow through the guide wheel 5 to the blade wheel 3 of the turbine and also start to drive the turbine. After a short time, the rotational speed of the rotor 1 exceeds the critical value and the gas turbine can be operated without outside energy supplied by the hot fuel gases from the own combustion chamber alone. The starting procedure is completed.

During the starting process, the supply channel 11 becomes very hot, for which reason an insulation ring 15 prevents heat transfer to the outer housing 7 of the gas turbine. The supply channel 11 is attached to the outer housing 7 in such a manner that even in a hot state, it can in no way get in contact through heat expansion with the blade wheel 3. The heat-resistant ring 14 serves as a pressure resistant seal towards the flow channel and can support a shifting of the supply channel 11 in a lengthwise direction.

For an even ignition of all sectional combustion chambers of the ring combustion chamber it is also possible to provide several branch lines 19 to each of these sectional combustion chambers. In this case, all branch lines 19 have a high pressure drop, so that the greatest component current for the exhaust gases is directed to the turbine. It would, alternatively, also be possible to only ignite one sectional combustion chamber and, starting from this ignited combustion chamber, to ignite the adjoining sectional combustion chambers in sequence.

In an advantageous embodiment of the invention it may be equally suitable to divide the supply channel 11 immediately after the exhaust gas source into two or more component currents and to lead these component currents separately into the inside of the gas turbine. The supply channel 11 also can divide in the form of a forked pipe, and does not have to be led vertically into the gas turbine. Under certain circumstances it may also be more suitable to arrange the exhaust gas source close to or directly on the gas turbine.

In a specially advantageous manner the exhaust gas source supplies exhaust gas with a temperature of at least 1200° C. This temperature is equally suitable for the ignition of the fuel and for driving the turbine. The exhaust gases are led from the exhaust gas source to the turbine in such a manner that the exhaust gases are sure to reach both.

I claim:

1. In a gas turbine which includes a compressor; a turbine that defines a central rotary axis; a plurality of combustion chambers which are annularly disposed around said turbine; an outer housing which encloses said compressor, said turbine and said combustion chambers; and an ignition means for starting said gas turbine; the improvement wherein said ignition means comprises a main hot exhaust gas supply channel which extends through said outer housing perpendicularly to said imaginary central axis, said main hot exhaust gas supply channel terminating within said outer housing at a discharge mouth which is directed towards said turbine so as to direct hot exhaust gases against said turbine and cause said turbine to rotate, and a plurality of branch hot exhaust gas supply channels within said outer housing which extend from said main fuel gas supply channel generally in parallel with said central rotary axis and respectively directly into said plurality of combustion chambers, each of said branch hot exhaust gas supply channels having a fan-shaped nozzle at its end within a respective combustion chamber for emitting a fan-shaped flow of exhaust gases into the respective combustion chamber to initiate combustion of fuel therein.

2. The gas turbine as defined in claim 1, wherein said turbine includes an annular blade wheel around its periphery and wherein the discharge mouth of said main hot exhaust gas supply channel faces said blade wheel such that hot exhaust gases emitted from said discharge mouth will impinge against said blade wheel to cause said turbine to rotate.

3. The gas turbine as defined in claim 1, wherein each of said branch hot exhaust gas supply channels has a cross sectional area which is less than a cross sectional area of said main hot exhaust gas supply channel.

4. The gas turbine as defined in claim 1, including a removable hot exhaust gas supply means connectable to an end of said main hot exhaust gas supply channel outside of said outer housing which is capable of supplying hot exhaust gases thereto having a temperature of at least 1200° C.

5. In a gas turbine which includes a compressor, a turbine that defines a central rotary axis; a combustion chamber; an outer housing which encloses said compressor, said turbine and said combustion chamber; and an ignition means for starting said gas turbine; the improvement wherein said ignition means comprises a main hot exhaust gas supply channel which extends through said outer housing perpendicularly to said imaginary central axis, said main hot exhaust gas supply channel terminating within said outer housing at a discharge mouth which is directed toward said turbine so as to direct hot exhaust gases against said turbine and cause said turbine to rotate, and a branch hot exhaust gas supply channel within said outer housing which extends from said main exhaust gas supply channel generally in parallel with said central rotary axis and into said combustion chamber to supply hot exhaust gases thereto to initiate combustion of fuel therein, said branch hot exhaust gas supply channel having a fan-shaped nozzle at an end within said combustion chamber.

6. The gas turbine as defined in claim 5, wherein said turbine includes an annlar blade wheel around its periphery and wherein the discharge mouth of said main hot exhaust gas supply channel faces said blade wheel such that hot exhaust gases emitted from said discharge mouth will impinge against said blade wheel to cause said turbine to rotate.

7. The gas turbine as defined in claim 5, wherein said branch hot exhaust gas supply channel has a cross sectional area which is less than a cross sectional area of said main hot exhaust gas supply channel.

8. The gas turbine as defined in claim 5, including a removable hot exhaust gas supply means connectable to an end of said main hot exhaust gas supply channel outside of said outer housing which is capable of supplying hot exhaust gases thereto having a temperature of at least 1200° C.

* * * * *